United States Patent
Levi et al.

(10) Patent No.: US 12,476,775 B2
(45) Date of Patent: Nov. 18, 2025

(54) SYNCHRONOUS CLOCK SYNCHRONIZATION MESSAGING

(71) Applicant: MELLANOX TECHNOLOGIES, LTD., Yokneam (IL)

(72) Inventors: Dotan David Levi, Kiryat Motzkin (IL); Wojciech Wasko, Młynek (PL)

(73) Assignee: Mellanox Technologies, Ltd, Yokneam (IL)

( * ) Notice: Subject to any disclaimer, the term of this patent is extended or adjusted under 35 U.S.C. 154(b) by 153 days.

(21) Appl. No.: 17/983,427

(22) Filed: Nov. 9, 2022

(65) Prior Publication Data

US 2024/0154783 A1   May 9, 2024

(51) Int. Cl.
*H04L 7/00* (2006.01)
*H04L 7/06* (2006.01)
*H04L 47/62* (2022.01)

(52) U.S. Cl.
CPC .............. *H04L 7/0008* (2013.01); *H04L 7/06* (2013.01); *H04L 47/6225* (2013.01)

(58) Field of Classification Search
CPC ..... H04L 7/0008; H04L 7/06; H04L 47/6225; H04J 3/0667
See application file for complete search history.

(56) References Cited

U.S. PATENT DOCUMENTS

| | | | | |
|---|---|---|---|---|
| 12,141,093 | B1 * | 11/2024 | Zur | G06F 15/17331 |
| 2014/0013008 | A1 * | 1/2014 | Lazarus | H04L 69/28 |
| | | | | 709/248 |
| 2022/0060427 | A1 * | 2/2022 | Gallego | G06F 9/546 |
| 2023/0044281 | A1 * | 2/2023 | Shin | H04W 12/12 |
| 2023/0205580 | A1 * | 6/2023 | Wu | G06F 15/825 |
| | | | | 718/106 |
| 2023/0341889 | A1 * | 10/2023 | Elliott | G06F 9/45558 |

OTHER PUBLICATIONS

IEEE Std. 1588-2008, "IEEE Standard for a Precision Clock Synchronization Protocol for Networked Measurement and Control Systems," The IEEE Instrumentation and Measurement Society, pp. 1-289, Jul. 24, 2008.

Li et al., "Sundial: Fault-Tolerant Clock Synchronization for Datacenters", Proceedings of the 14th USENIX Symposium on Operating Systems Design and Implementation, pp. 1171-1186, Nov. 2020.

Wasko et al., U.S. Appl. No. 17/988,812, filed Nov. 17, 2022.
Sur et al., U.S. Appl. No. 17/450,743, filed Oct. 13, 2021.

* cited by examiner

*Primary Examiner* — David B Lugo
(74) *Attorney, Agent, or Firm* — Meitar Patents Ltd.; Daniel Kligler (57) ABSTRACT

In one embodiment, a system includes a network interface controller to receive a first clock-synchronization message from a clock-synchronization leader device and send a second clock-synchronization messages to at least one clock-synchronization follower device, and a processor to execute software to generate the second clock-synchronization message, and generate a control dependency to condition sending the second clock-synchronization message by the network interface controller to the at least one clock-synchronization follower device on the network interface controller receiving the first clock-synchronization message from the clock-synchronization leader device.

35 Claims, 4 Drawing Sheets

SYNCHRONOUS CLOCK SYNCHRONIZATION MESSAGING

The project leading to this application has received funding from the European Union's Horizon 2020 research and innovation program under grant agreement No. 957403.

FIELD OF THE INVENTION

The present invention relates to computer networks, and in particular, but not exclusively to, clock synchronization.

BACKGROUND

Clock synchronization between devices in a network may be performed for many applications such as database data integrity in a datacenter. Synchronization messages are sent from a clock master device to a clock slave device so that the clock slave device may synchronize to the clock of the clock master device. Between receiving synchronization messages, the clock slave device accumulates a clock error which grows as a function of the time between clock synchronization messages. Once a synchronization message is received, the error resets (e.g., to zero) and then the error grows until the next message is received. In certain applications the clock error may be used to decide whether a given operation should be performed. For example, data center customers (e.g., using distributed databases) may need to know what the clock error bounds are at any given instance (i.e., what is the maximum worst deviation from true time) to prevent data corruption. Therefore, each node in a synchronized data center needs to know its error bound at any given time.

New Precision Time Protocol (PTP) messaging schemes are emerging in the industry, including synchronous messaging schemes such as Google Sundial (https://research.google/pubs/pub49716.pdf) which aim to quantify, control and reduce the uncertainty associated with inter-synchronization message intervals and potential synchronization hierarchy failures.

SUMMARY

There is provided in accordance with an embodiment of the present disclosure, a clock synchronization system, including a network interface controller to receive a first clock-synchronization message from a clock-synchronization leader device and send a second clock-synchronization message to at least one clock-synchronization follower device, and a processor to execute software to generate the second clock-synchronization message, and generate a control dependency to condition sending the second clock-synchronization message by the network interface controller to the at least one clock-synchronization follower device on the network interface controller receiving the first clock-synchronization message from the clock-synchronization leader device.

Further in accordance with an embodiment of the present disclosure the software is configured to enqueue a first work queue entry to process receipt of the first clock-synchronization message by the network interface controller, enqueue a second work queue entry to process sending the second clock-synchronization message by the network interface controller, and etiquette the control dependency to condition sending the second clock-synchronization message by the network interface controller to the at least one clock-synchronization follower device on the network interface controller receiving the first clock-synchronization message from the clock-synchronization leader device.

Still further in accordance with an embodiment of the present disclosure the software is configured to enqueue the first work queue entry, the second work queue entry, and the control dependency to a same work queue.

Additionally in accordance with an embodiment of the present disclosure the software is configured to enqueue the first work queue entry in a receive work queue, and the second work queue entry in a send work queue.

Moreover, in accordance with an embodiment of the present disclosure the software is configured to enqueue a semaphore post to update a flag responsively to the processing the receipt of the first clock-synchronization message by the network interface controller, and enqueue a semaphore acquire to intermittently check the flag for a given value.

Further in accordance with an embodiment of the present disclosure the software is configured to enqueue the semaphore post in a receive work queue after the first work queue entry, and enqueue the semaphore acquire in a send work queue prior to the second work queue entry.

Still further in accordance with an embodiment of the present disclosure the network interface controller is configured to process receipt of the first clock-synchronization message responsively to the enqueued first work queue entry, update the flag responsively to enqueued semaphore post and the processing the receipt of the first clock-synchronization message, intermittently check the flag for the given value responsively to the enqueued semaphore acquire, and process sending the second clock-synchronization message responsively to the semaphore acquire having completed execution and the enqueued second work queue entry.

Additionally in accordance with an embodiment of the present disclosure the network interface controller is configured to update the flag to a given value responsively to the enqueued semaphore post and to the processing the receipt of the first clock-synchronization message.

Moreover, in accordance with an embodiment of the present disclosure the network interface controller is configured to update the flag to include a sequence number from the first clock-synchronization message responsively to the enqueued semaphore post and to the processing the receipt of the first clock-synchronization message.

Further in accordance with an embodiment of the present disclosure the network interface controller is configured to increment a value of the flag responsively to the enqueued semaphore post and to the processing the receipt of the first clock-synchronization message.

There is also provided in accordance with another embodiment of the present disclosure, a clock synchronization method, including receiving a first clock-synchronization message from a clock-synchronization leader device, generating a second clock-synchronization message, generating a control dependency to condition sending the second clock-synchronization message to at least one clock-synchronization follower device on receiving the first clock-synchronization message from the clock-synchronization leader device, and sending the second clock-synchronization message to the at least one clock-synchronization follower device.

Still further in accordance with an embodiment of the present disclosure, the method includes enqueuing a first work queue entry to process receipt of the first clock-synchronization message, enqueuing a second work queue entry to process sending the second clock-synchronization message, and enqueuing the control dependency to condition sending the second clock-synchronization message to the at least one clock-synchronization follower device on the receiving the first clock-synchronization message from the clock-synchronization leader device.

Additionally in accordance with an embodiment of the present disclosure the first work queue entry, the second work queue entry, and the control dependency are enqueued to a same work queue.

Moreover, in accordance with an embodiment of the present disclosure the enqueueing the first work queue entry includes enqueueing the first work queue entry in a receive work queue, and the enqueueing the second work queue entry includes the enqueueing the second work queue entry in a send work queue.

Further in accordance with an embodiment of the present disclosure enqueuing the control dependency includes enqueueing a semaphore post to update a flag responsively to the processing the receipt of the first clock-synchronization message, and enqueueing a semaphore acquire to intermittently check the flag for a given value.

Still further in accordance with an embodiment of the present disclosure enqueueing the semaphore post includes enqueueing the semaphore post in a receive work queue after the first work queue entry, and enqueueing the semaphore acquire includes enqueueing the semaphore acquire in a send work queue prior to the second work queue entry.

Additionally in accordance with an embodiment of the present disclosure, the method includes processing receipt of the first clock-synchronization message responsively to the enqueued first work queue entry, updating the flag responsively to enqueued semaphore post and the processing the receipt of the first clock-synchronization message, intermittently checking the flag for the given value responsively to the enqueued semaphore acquire, and processing sending the second clock-synchronization message responsively to the semaphore acquire having completed execution and the enqueued second work queue entry.

Moreover, in accordance with an embodiment of the present disclosure the updating the flag includes updating the flag to a given value responsively to the enqueued semaphore post and to the processing the receipt of the first clock-synchronization message.

Further in accordance with an embodiment of the present disclosure the updating the flag includes updating the flag to include a sequence number from the first clock-synchronization message responsively to the enqueued semaphore post and to the processing the receipt of the first clock-synchronization message.

Still further in accordance with an embodiment of the present disclosure the updating the flag includes incrementing a value of the flag responsively to the enqueued semaphore post and to the processing the receipt of the first clock-synchronization message.

There is also provided in accordance with still another embodiment of the present disclosure, a processing device, including a processor to execute software to generate a second clock-synchronization message, and generate a control dependency to condition sending the second clock-synchronization message by a network interface controller to at least one clock-synchronization follower device on the network interface controller receiving a first clock-synchronization message from a clock-synchronization leader device, and a memory to store data used by the processor.

Additionally in accordance with an embodiment of the present disclosure the software is configured to enqueue a first work queue entry to process receipt of the first clock-synchronization message by the network interface controller, enqueue a second work queue entry to process sending the second clock-synchronization message by the network interface controller, and enqueue the control dependency to condition sending the second clock-synchronization message by the network interface controller to the at least one clock-synchronization follower device on the network interface controller receiving the first clock-synchronization message from the clock-synchronization leader device.

Moreover, in accordance with an embodiment of the present disclosure the software is configured to enqueue the first work queue entry, the second work queue entry, and the control dependency to a same work queue.

Further in accordance with an embodiment of the present disclosure the software is configured to enqueue the first work queue enter in a receive work queue, and the second work queue entry in a send work queue.

Still further in accordance with an embodiment of the present disclosure the software is configured to enqueue a semaphore post to update a flag responsively to the processing the receipt of the first clock-synchronization message by the network interface controller, and enqueue a semaphore acquire to intermittently check the flag for a given value.

Additionally in accordance with an embodiment of the present disclosure the software is configured to enqueue the semaphore post in a receive work queue after the first work queue entry, and enqueue the semaphore acquire in a send work queue prior to the second work queue entry.

There is also provided in accordance with still another embodiment of the present disclosure a network interface controller device, including a network interface to receive a first clock-synchronization message from a clock-synchronization leader device and send a second clock-synchronization message to at least one clock-synchronization follower device, and packet processing circuitry to process sending the second clock-synchronization message responsively to a control dependency, which conditions sending the second clock-synchronization message to the at least one clock-synchronization follower device on receiving the first clock-synchronization message from the clock-synchronization leader device.

Moreover in accordance with an embodiment of the present disclosure the packet processing circuitry is configured to process receipt of the first clock-synchronization message responsively to an enqueued first work queue entry, update a flag responsively to an enqueued semaphore post and the processing the receipt of the first clock-synchronization message, intermittently check the flag for a given value responsively to an enqueued semaphore acquire, and process sending the second clock-synchronization message responsively to the semaphore acquire having completed execution.

Further in accordance with an embodiment of the present disclosure the packet processing circuitry is configured to update the flag to the given value responsively to the enqueued semaphore post and to the processing the receipt of the first clock-synchronization message.

Still further in accordance with an embodiment of the present disclosure the packet processing circuitry is configured to update the flag to include a sequence number from the first clock-synchronization message responsively to the enqueued semaphore post and to the processing the receipt of the first clock-synchronization message.

Additionally in accordance with an embodiment of the present disclosure the packet processing circuitry is configured to increment a value of the flag responsively to the enqueued semaphore post and to the processing the receipt of the first clock-synchronization message.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

In typical (asynchronous) PTP messaging schemes, synchronization failures are detected based on timeouts of low-frequency messages such as "announce" messages. Each node sends its announcement messages asynchronously with respect to the other nodes. Those messages are infrequent (on the order of 1 message every two seconds, for example).

Typically, in order for a master clock failure to propagate downstream, a node needs to locally detect failure (e.g., based on announce timeout) and invoke a centralized failure recovery scheme. Specifically, the PTP standard does not make provisions for a boundary clock to directly communicate the failure it detected to its followers. The boundary clock continues to serve synchronization messages to the followers even if it does not receive synchronization messages from the leader, e.g., due to a failure upstream. Thus, the followers will continue to synchronize to a boundary clock that is no longer disciplining its clock according to its leader. As can be appreciated, the time for the failure to be known to all nodes in the network can be quite large and can lead to large time uncertainties.

One partial solution is to employ a synchronous messaging scheme using a strict synchronization message sending schedule and a set of associated timeouts, A master clock sends synchronization messages very frequently (e.g., one synchronization message every 100 microseconds) and on a strict schedule (e.g., each synchronization message is sent aligned to a 100-microsecond multiple). The boundary clock also sends according to the schedule. There is a timeout associated with reception of each synchronization message. This timeout is typically very small (on the order of microseconds) as the synchronization message should be sent at a well-known time. Failure to receive such message is detected very quickly and indicates a synchronization fault.

Another solution is to configure boundary clocks to send synchronization messages to their followers immediately after receiving a valid synchronization message from their leader. This ensures that if there is a failure somewhere in the synchronization tree, and a boundary clock fails to receive a synchronization message from its leader, there exists a bounded time (which can be calculated from the network propagation delay and the receive timeout) in which information about this failure will be propagated to all downstream nodes (since they will stop receiving synchronization messages).

Synchronous messaging is implemented at hardware level which requires dedicated hardware design and custom software development. One disadvantage of using hardware is that the structure of the synchronization messages cannot be (significantly) changed over time.

Embodiments of the present invention provide a synchronous messaging scheme in a boundary clock which receives a first clock synchronization message from a leader device and sends a second clock synchronization message to one or more follower devices. The second clock synchronization message is generated by software running on a processor (e.g., in a host device) and a network interface controller (NIC) connected to the processor conditions sending the second clock synchronization message to the follower device(s) upon receipt of the first clock synchronization message by the NIC from the leader device. In this manner, the second synchronization message may be suitably formatted by software without being restricted by hardware design while providing synchronous messaging.

In some embodiments, the second clock synchronization message is provided by the processor to the NIC where the second clock synchronization message is queued for sending to the follower device(s) and is only sent to the follower device(s) once the first clock synchronization message is received from the leader device. The software typically generates a control dependency to condition sending the second clock synchronization message to the follower device(s) on receiving the first clock synchronization message from the leader device. The control dependency may be implemented using one or more work queue entries (e.g., semaphores or fences) added to the send and/or receive work queues of the NIC.

In some embodiments, the software enqueues a first work queue entry to process receipt of the first clock-synchronization message by the network interface controller, a second work queue entry to process sending the second clock-synchronization message (generated by the software) by the network interface controller, and a control dependency to condition executing the second work queue entry (i.e., sending the second clock-synchronization message by the network interface controller to the follower device(s)) on the first work queue entry being executed (i.e., the NIC processing receipt of the first clock-synchronization message from the leader device).

In some embodiments, the software enqueues the first work queue entry, second work queue entry and the control dependency in the same queue whereby the control dependency acts as a fence entry and prevents execution of the second work queue entry by the MC until the first work queue entry is executed by the MC.

In some embodiments, the software enqueues the control dependency using a "semaphore post" and "acquire". The software enqueues the "semaphore post" in a receive work queue after the first work queue entry so that the NIC updates a flag responsively to the NIC processing the first work queue entry (i.e., processing the receipt of the first clock-synchronization message). The software enqueues the "semaphore acquire" for the NIC to intermittently check the flag for a given value and when the given value is detected by the NIC, the semaphore acquire completes execution and allows the NIC to execute the second work queue entry (i.e., sending the second clock-synchronization message), which is queued in a send work queue after the "semaphore acquire".

In some embodiments, the semaphore post causes the NIC to update the flag to a given value known to the NIC) responsively to the NIC processing receipt of the first clock-synchronization message. In some embodiments, the semaphore post causes the NIC to update the flag to include a sequence number (e.g., included in a PIP header) from the first clock-synchronization message responsively to NIC processing receipt of the first clock-synchronization message. In some embodiments, the semaphore post causes the NIC to increment (e.g., by 1) a value of the flag responsively to the NIC processing receipt of the first clock-synchronization message.

System Description

Figure 1:
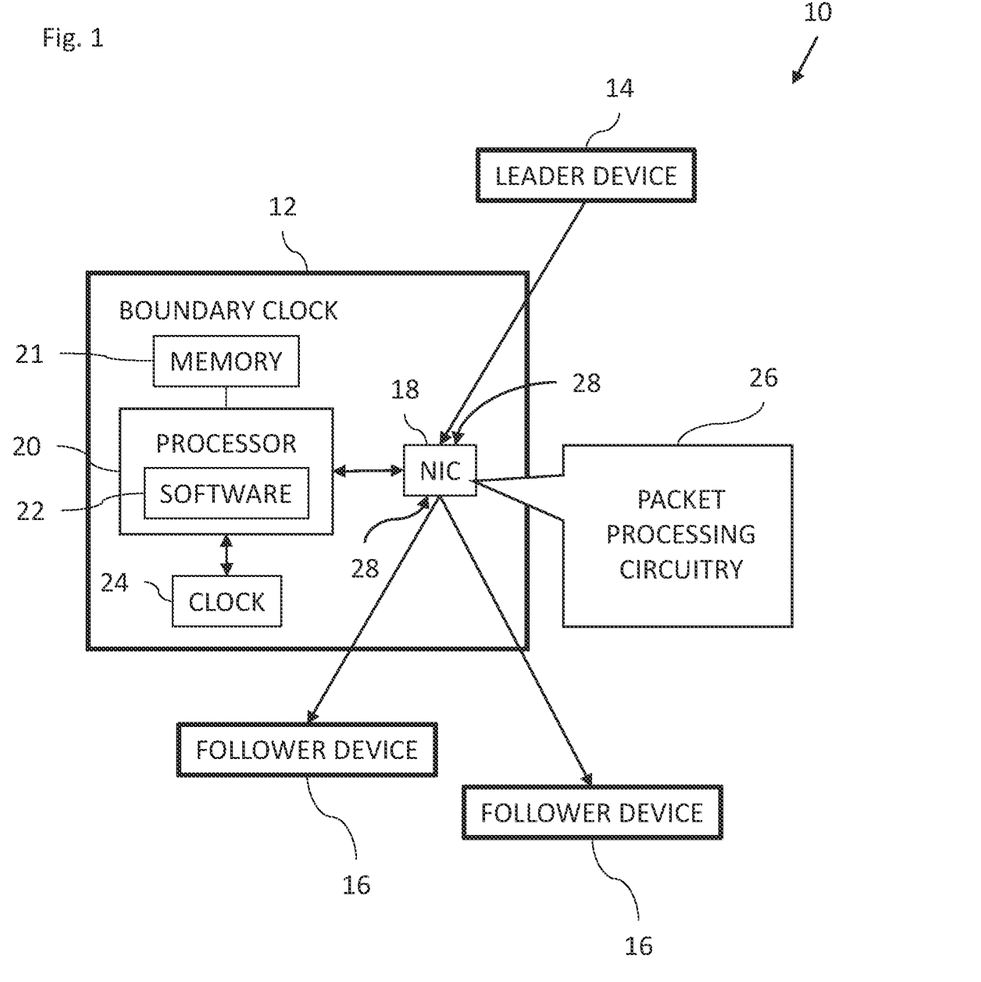
FIG. 1 is a block diagram view of a clock synchronization system constructed and operative in accordance with an embodiment of the present invention.

Reference is now made to FIG. 1, which is a block diagram view of a clock synchronization system 10 constructed and operative in accordance with an embodiment of the present invention.

The system includes a boundary clock device 12, a leader device 14, and one or more follower devices 16. The device 12 includes a network interface controller 18, a processor 20 configured to execute software 22, a memory 21 to store data used by the processor 20, and a clock 24 (e.g., a physical hardware clock). In some embodiments, the processor 20 and the memory 21 may be comprised in a device which is independent of the network interface controller 18. In some embodiments, at least some of the functions of the processor 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory. The clock may be disposed in the network interface controller 18 or a host device (which includes the processor 20) or another peer device.

The network interface controller 18 may include packet processing circuitry 26 and a network interface 28. The packet processing circuitry 26 is configured to execute work queue entries queued in one or more work queues described in more detail with reference to FIGS. 2-5. The work queue(s) may be stored in the network interface controller 18, the host device, or another peer device. The work queues may be processed by packet processing circuitry 26 for example, prior to MAC and physical layer (PHY) units in the packet processing circuitry 26. The packet processing circuitry 26 may comprise an application specific integrated circuit to process the queues or a microprocessor programed with suitable software. In practice, some or all of the functions of the packet processing circuitry 26 may be combined in a single physical component or, alternatively, implemented using multiple physical components. These physical components may comprise hard-wired or programmable devices, or a combination of the two. In some embodiments, at least some of the functions of the packet processing circuitry 26 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
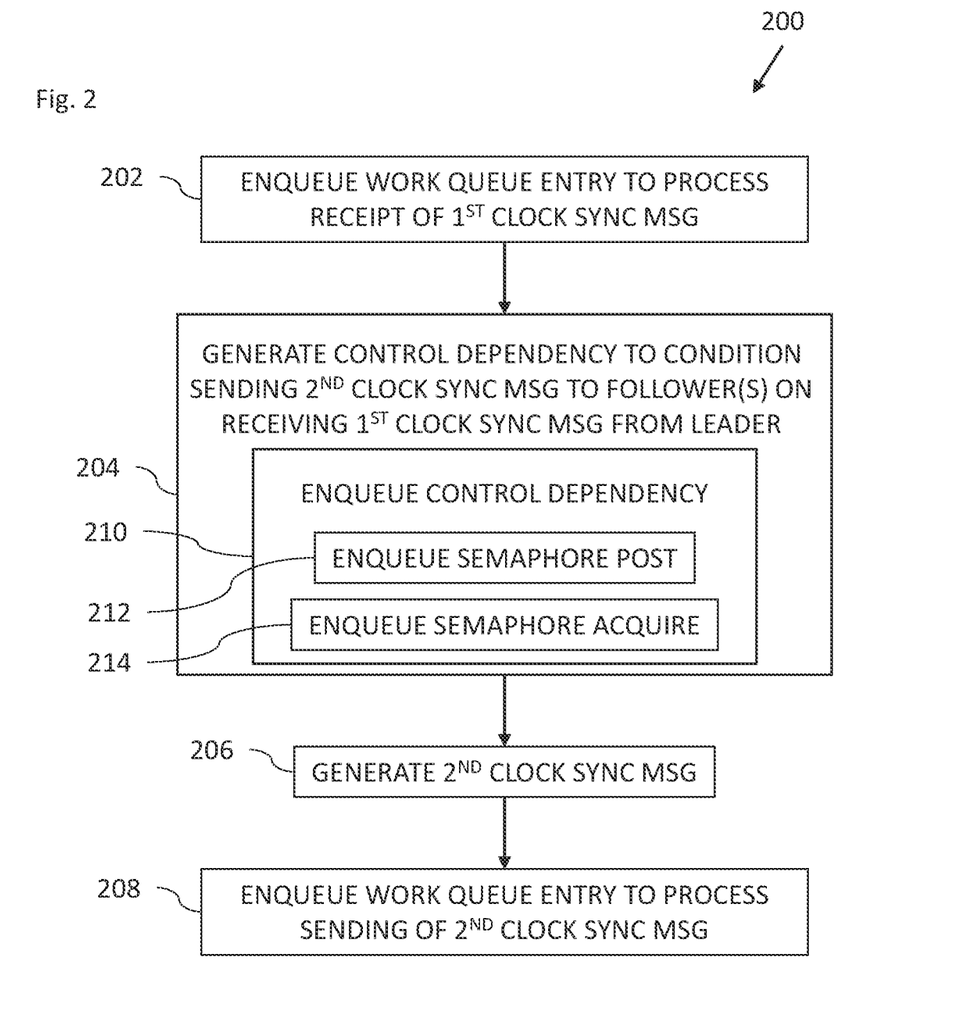
FIG. 2 is a flowchart including steps in a first method in the system of FIG. 1.

Reference is now made to FIG. 2, which is a flowchart 200 including steps in a first method in the system 10 of FIG. 1. The software 22 is configured to enqueue a first work queue entry to process receipt of a first clock-synchronization message from the leader device 14 by the network interface controller 18 (block 202). The software 22 is configured to generate a control dependency described in more detail below (block 204).

The software 22 is configured to generate a second clock-synchronization message and provide the second clock-synchronization message to the network interface controller 18 (for example, by writing the second clock-synchronization message to a memory in a host device or a memory of the network interface controller 18) (block 206). The software 22 is configured to enqueue second work queue entry to process sending the second clock-synchronization message by the network interface controller 18 (block 208).

As previously mentioned, the software 22 is configured to generate a control dependency (which may include, or be replaced by, a timing mechanism) to condition sending the second clock-synchronization message by the network interface controller 18 to the clock-synchronization follower device(s) 16 on the network interface controller 18 receiving the first clock-synchronization message from the clock-synchronization leader device 14. In some embodiments, the software is configured to enqueue the control dependency to condition sending the second clock-synchronization message by the network interface controller 18 to the clock-synchronization follower device(s) 16 on the network interface controller 18 receiving the first clock-synchronization message from the clock-synchronization leader device 14 (block 210).

In some embodiments, the software 22 is configured to enqueue the first work queue entry, the second work queue entry, and the control dependency to the same work queue wherein the control dependency is a fence entry which prevents execution of the second work queue entry until the first work queue entry is executed by the network interface controller 18. In other embodiments, the software 22 is configured to enqueue the first work queue entry in a receive work queue, and the second work queue entry in a send work queue. An example of the other embodiments in now described below.

In some embodiments, the software 22 is configured to enqueue the control dependency by enqueueing a "semaphore post" and "semaphore acquire". The software 22 is configured to enqueue a semaphore post to update a flag responsively to the processing the receipt of the first clock-synchronization message by the network interface controller 18 (block 212), and enqueue a semaphore acquire to intermittently check the flag for a given value (block 214). The semaphore post and acquire are described in more detail below.

In some embodiments, the software 22 is configured to enqueue the semaphore post in a receive work queue after the first work queue entry (so that the semaphore post is executed after the first work queue entry), and enqueue the semaphore acquire in a send work queue prior to the second work queue entry (so that the semaphore acquire is executed before the second work queue entry). When the first clock-synchronization message is received by the network interface controller 18, the network interface controller 18 processes receipt of the first clock-synchronization message according to the first work queue entry in the receive work queue. Responsively to the network interface controller 18 executing the first work queue entry, i.e., responsively the network interface controller 18 processing receipt of the first clock-synchronization message, the network interface controller 18 executes the semaphore post enqueued after the first work queue entry in the receive work queue causing the network interface controller 18 to update a flag (which the semaphore acquire is tracking).

Although the second work queue entry is in the send work queue, the network interface controller 18 does not process sending the second clock-synchronization message as the semaphore acquire blocks execution of the second work queue entry. The network interface controller 18 intermittently checks the flag for a given value (based on the enqueued semaphore acquire). When the flag is equal to the given value the semaphore acquire has completed execution and the network interface controller 18 moves to the next work queue entry in the send queue which is the second work queue entry. The network interface controller 18 therefore continues to process sending the second clock synchronization message according to the second work queue entry.

Figure 3:
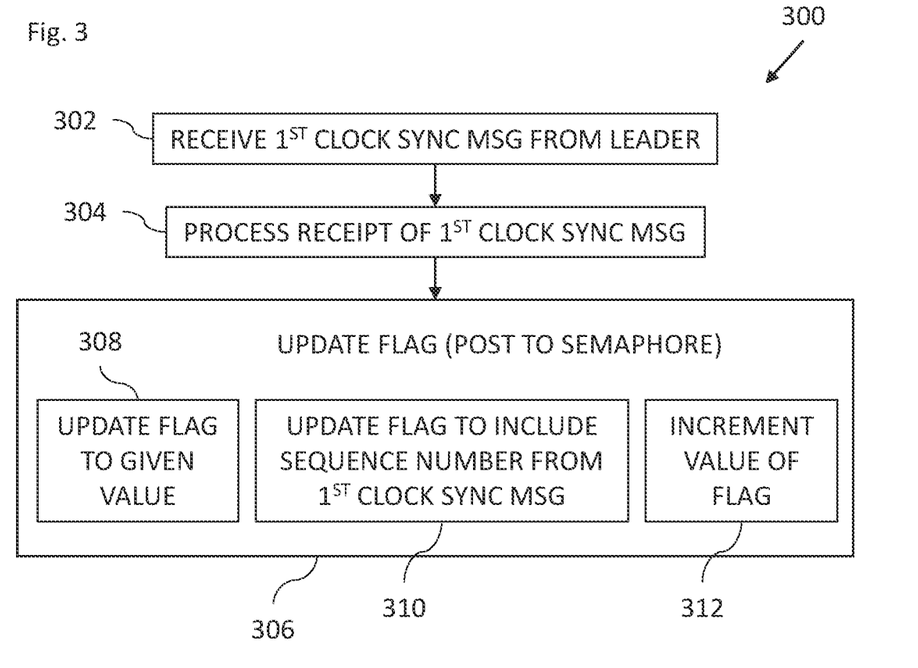
FIG. 3 is a flowchart including steps in a second method in the system of FIG. 1.

Reference is now made to FIG. 3, which is a flowchart 300 including steps in a second method in the system 10 of FIG. 1. The network interface 28 of the network interface controller 18 is configured to receive the first clock-synchronization message from the leader device 14 (block 302). The packet processing circuitry 26 of the network interface controller 18 is configured to process receipt of the first clock-synchronization message responsively to the enqueued first work queue entry (block 304). In response to processing receipt of the first clock-synchronization message, the network interface controller 18 is configured to update the flag responsively to enqueued semaphore post (block 306). The step of block 306 may include any of the steps 308-312 described below.

In some embodiments, in response to processing receipt of the first clock-synchronization message, the packet processing circuitry 26 of the network interface controller 18 is configured to update the flag to the given value (known to the network interface controller 18) responsively to the enqueued semaphore post (block 308). In some embodiments, in response to processing receipt of the first clock-synchronization message, the packet processing circuitry 26 of the network interface controller 18 is configured to update the flag to include a sequence number from the first clock-synchronization message (e.g., a sequence number in a PTP header of the first clock-synchronization message) responsively to the enqueued semaphore post (block 310). In some embodiments, in response to processing receipt of the first clock-synchronization message, the packet processing circuitry 26 of the network interface controller 18 is configured to increment (e.g., by 1 or any suitable positive or negative value) a value of the flag responsively to the enqueued semaphore post (block 312).

Figure 4:
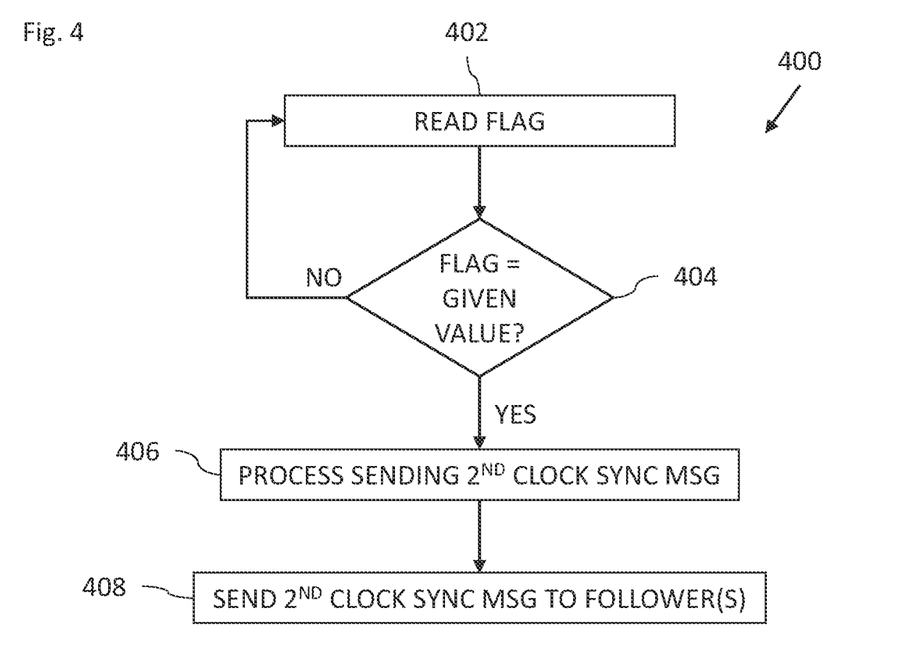
FIG. 4 is a flowchart including steps in a third method in the system of FIG. 1.

Reference is now made to FIG. 4, which is a flowchart 400 including steps in a third method in the system 10 of FIG. 1. The packet processing circuitry 26 of the network interface controller 18 is configured to intermittently check the flag for the given value responsively to the enqueued semaphore acquire. Therefore, the packet processing; circuitry 26 of the network interface controller 18 is configured to read the flag from a memory (not shown) (block 402). At a decision block 404, the packet processing circuitry 26 of the network interface controller 18 is configured to compare the flag to the given value. The given value may be equal to the sequence number included in the first clock-synchronization message or another suitable value depending on the method selected to update the flag as described in more detail with reference to the steps of blocks 306-312 of FIG. 3. If the flag is not equal to the given value, the step of block 402 is repeated (optionally after a suitable delay). If the flag is equal to the given value, the enqueued semaphore acquire completes execution, and the packet processing circuitry 26 of the network interface controller 18 is configured to process sending the second clock-synchronization message according to the second work queue entry (after the semaphore acquire) in the send work queue (block 406). Therefore, the packet processing circuitry 26 is configured to process sending the second clock-synchronization message responsively to the control dependency, which conditions sending the second clock-synchronization message to the clock-synchronization follower device(s) 16 on receiving the first clock-synchronization message from the clock-synchronization leader device 14. The network interface 28 of the network interface controller 18 is configured to send the second clock-synchronization message to follower device(s) 16 (block 408).

Figure 5:
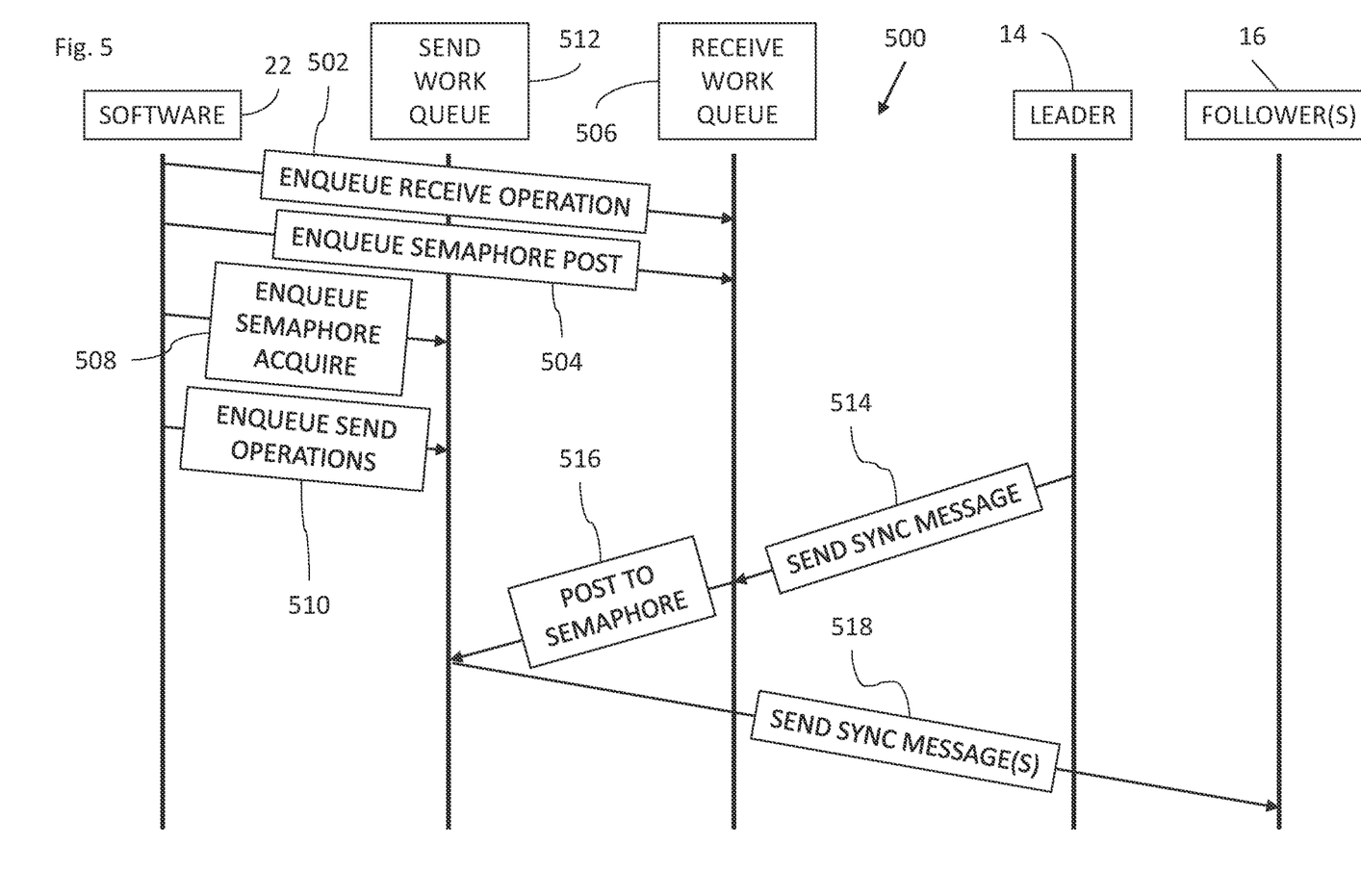
FIG. 5 is a data flow diagram illustrating a method of operation of the system of FIG. 1.

Reference is now made to FIG. 5, which is a data flow diagram 500 illustrating a method of operation of the system 10 of FIG. 1. The software 22 enqueues the receive operation (block 502) to process receipt of the first clock-synchronization message and the semaphore post (block 504) to a receive work queue 506. The software 22 enqueues to a send work queue 512 the semaphore acquire (block 508) and the send operations (block 510) to process sending the second clock-synchronization message to the follower devices) 16. The first clock-synchronization message is sent by the leader device 14 to the network interface controller 18 (FIG. 1) (block 514) and is processed by the network interface controller 18 according to the receive operation (block 502) in the receive work queue 506. In response to processing the receive operation, the network interface controller 18 posts (block 516) to the semaphore based on the semaphore post (block 504). The network interface controller 18 checks the value of the flag according to the semaphore acquire (block 508) and when the value of the flag is equal to the given value (and the semaphore acquire has completed execution), the network interface controller 18 sends the second clock-synchronization message to the follower device(s) 16 (block 518) according to the send operations (block 510) in the send work queue 512.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove, Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A boundary clock device, comprising:
   a network interface controller to receive a first clock-synchronization message from a clock-synchronization leader device and send a second clock-synchronization message to at least one clock-synchronization follower device, the clock-synchronization leader device and the clock-synchronization follower device being external to the boundary clock device; and
   a processor to execute software to:
      generate the second clock-synchronization message before receiving the first clock-synchronization message; and enqueue a control dependency to condition sending the second clock-synchronization message by the network interface controller to the at least one clock-synchronization follower device on the network interface controller receiving the first clock-synchronization message from the clock-synchronization leader device.

2. The device according to claim 1, wherein the software is configured to:
enqueue a first work queue entry to process receipt of the first clock-synchronization message by the network interface controller;
enqueue a second work queue entry to process sending the second clock-synchronization message by the network interface controller; and
enqueue the control dependency to condition sending the second clock-synchronization message by the network interface controller to the at least one clock-synchronization follower device on the network interface controller receiving the first clock-synchronization message from the clock-synchronization leader device.

3. The device according to claim 2, wherein the software is configured to enqueue the first work queue entry, the second work queue entry, and the control dependency to a same work queue.

4. The device according to claim 2, wherein the software is configured to enqueue the first work queue entry in a receive work queue, and the second work queue entry in a send work queue.

5. The device according to claim 2, wherein the software is configured to:
enqueue a semaphore post to update a flag responsively to the processing the receipt of the first clock-synchronization message by the network interface controller; and
enqueue a semaphore acquire to intermittently check the flag for a given value.

6. The device according to claim 5, wherein the software is configured to:
enqueue the semaphore post in a receive work queue after the first work queue entry; and
enqueue the semaphore acquire in a send work queue prior to the second work queue entry.

7. The device according to claim 6, wherein the network interface controller is configured to:
process receipt of the first clock-synchronization message responsively to the enqueued first work queue entry;
update the flag responsively to enqueued semaphore post and the processing the receipt of the first clock-synchronization message;
intermittently check the flag for the given value responsively to the enqueued semaphore acquire; and
process sending the second clock-synchronization message responsively to the semaphore acquire having completed execution and the enqueued second work queue entry.

8. The device according to claim 5, wherein the network interface controller is configured to update the flag to a given value responsively to the enqueued semaphore post and to the processing the receipt of the first clock-synchronization message.

9. The device according to claim 5, wherein the network interface controller is configured to update the flag to include a sequence number from the first clock-synchronization message responsively to the enqueued semaphore post and to the processing the receipt of the first clock-synchronization message.

10. The device according to claim 5, wherein the network interface controller is configured to increment a value of the flag responsively to the enqueued semaphore post and to the processing the receipt of the first clock-synchronization message.

11. A clock synchronization method, comprising:
generating by a boundary clock device a second clock-synchronization message before receiving a first clock-synchronization message from a clock-synchronization leader device;
receiving by the boundary clock device the first clock-synchronization message from a clock-synchronization leader device;
enqueueing by the boundary clock device a control dependency to condition sending the second clock-synchronization message to at least one clock-synchronization follower device on receiving the first clock-synchronization message from the clock-synchronization leader device, the clock-synchronization leader device and the clock-synchronization follower device being external to the boundary clock device; and
sending by the boundary clock device the second clock-synchronization message to the at least one clock-synchronization follower device.

12. The method according to claim 11, further comprising:
enqueuing a first work queue entry to process receipt of the first clock-synchronization message;
enqueuing a second work queue entry to process sending the second clock-synchronization message; and
enqueuing the control dependency to condition sending the second clock-synchronization message to the at least one clock-synchronization follower device on the receiving the first clock-synchronization message from the clock-synchronization leader device.

13. The method according to claim 12, wherein the first work queue entry, the second work queue entry, and the control dependency are enqueued to a same work queue.

14. The method according to claim 12, wherein:
the enqueueing the first work queue entry includes enqueueing the first work queue entry in a receive work queue; and
the enqueueing the second work queue entry includes the enqueueing the second work queue entry in a send work queue.

15. The method according to claim 12, wherein enqueuing the control dependency includes:
enqueueing a semaphore post to update a flag responsively to the processing the receipt of the first clock-synchronization message; and
enqueueing a semaphore acquire to intermittently check the flag for a given value.

16. The method according to claim 15, wherein:
enqueueing the semaphore post includes enqueueing the semaphore post in a receive work queue after the first work queue entry; and
enqueueing the semaphore acquire includes enqueueing the semaphore acquire in a send work queue prior to the second work queue entry.

17. The method according to claim 16, further comprising:
processing receipt of the first clock-synchronization message responsively to the enqueued first work queue entry;
updating the flag responsively to enqueued semaphore post and the processing the receipt of the first clock-synchronization message;

intermittently checking the flag for the given value responsively to the enqueued semaphore acquire; and processing sending the second clock-synchronization message responsively to the semaphore acquire having completed execution and the enqueued second work queue entry.

18. The method according to claim 15, wherein the updating the flag includes updating the flag to a given value responsively to the enqueued semaphore post and to the processing the receipt of the first clock-synchronization message.

19. The method according to claim 15, wherein the updating the flag includes updating the flag to include a sequence number from the first clock-synchronization message responsively to the enqueued semaphore post and to the processing the receipt of the first clock-synchronization message.

20. The method according to claim 15, wherein the updating the flag includes incrementing a value of the flag responsively to the enqueued semaphore post and to the processing the receipt of the first clock-synchronization message.

21. A processing device, comprising:
a processor to execute software to:
generate a second clock-synchronization message before receiving a first clock-synchronization message; and
enqueue a control dependency to condition sending the second clock-synchronization message by a network interface controller to at least one clock-synchronization follower device on the network interface controller receiving the first clock-synchronization message from a clock-synchronization leader device, the clock-synchronization leader device and the clock-synchronization follower device being external to a boundary clock device, which includes the processing device and the network interface controller; and
a memory to store data used by the processor.

22. The device according to claim 21, wherein the software is configured to:
enqueue a first work queue entry to process receipt of the first clock-synchronization message by the network interface controller;
enqueue a second work queue entry to process sending the second clock-synchronization message by the network interface controller; and
enqueue the control dependency to condition sending the second clock-synchronization message by the network interface controller to the at least one clock-synchronization follower device on the network interface controller receiving the first clock-synchronization message from the clock-synchronization leader device.

23. The device according to claim 22, wherein the software is configured to enqueue the first work queue entry, the second work queue entry, and the control dependency to a same work queue.

24. The device according to claim 22, wherein the software is configured to enqueue the first work queue entry in a receive work queue, and the second work queue entry in a send work queue.

25. The device according to claim 22, wherein the software is configured to:
enqueue a semaphore post to update a flag responsively to the processing the receipt of the first clock-synchronization message by the network interface controller; and
enqueue a semaphore acquire to intermittently check the flag for a given value.

26. The device according to claim 25, wherein the software is configured to:
enqueue the semaphore post in a receive work queue after the first work queue entry; and
enqueue the semaphore acquire in a send work queue prior to the second work queue entry.

27. A network interface controller device, comprising:
a network interface to receive a first clock-synchronization message from a clock-synchronization leader device and send a second clock-synchronization message to at least one clock-synchronization follower device, the clock-synchronization leader device and the clock-synchronization follower device being external to a boundary clock device, which includes the network interface controller device; and
packet processing circuitry to process sending the second clock-synchronization message responsively to an enqueued control dependency, which conditions sending the second clock-synchronization message to the at least one clock-synchronization follower device on receiving the first clock-synchronization message from the clock-synchronization leader device wherein the second clock-synchronization message is generated before receiving the first clock-synchronization message.

28. The device according to claim 27, wherein the packet processing circuitry is configured to:
process receipt of the first clock-synchronization message responsively to an enqueued first work queue entry;
update a flag responsively to an enqueued semaphore post and the processing the receipt of the first clock-synchronization message;
intermittently check the flag for a given value responsively to an enqueued semaphore acquire; and
process sending the second clock-synchronization message responsively to the semaphore acquire having completed execution.

29. The device according to claim 28, wherein the packet processing circuitry is configured to update the flag to the given value responsively to the enqueued semaphore post and to the processing the receipt of the first clock-synchronization message.

30. The device according to claim 28, wherein the packet processing circuitry is configured to update the flag to include a sequence number from the first clock-synchronization message responsively to the enqueued semaphore post and to the processing the receipt of the first clock-synchronization message.

31. The device according to claim 28, wherein the packet processing circuitry is configured to increment a value of the flag responsively to the enqueued semaphore post and to the processing the receipt of the first clock-synchronization message.

32. A boundary clock device, comprising:
a network interface controller to receive a first clock-synchronization message from a clock-synchronization leader device and send a second clock-synchronization message to at least one clock-synchronization follower device, the clock-synchronization leader device and the clock-synchronization follower device being external to the boundary clock device; and
a processor to execute software to:
generate the second clock-synchronization message before receiving the first clock-synchronization message;

generate a control dependency to condition sending the second clock-synchronization message by the network interface controller to the at least one clock-synchronization follower device on the network interface controller receiving the first clock-synchronization message from the clock-synchronization leader device;

enqueue a first work queue entry to process receipt of the first clock-synchronization message by the network interface controller;

enqueue a second work queue entry to process sending the second clock-synchronization message by the network interface controller; and enqueue the control dependency to condition sending the second clock-synchronization message by the network interface controller to the at least one clock-synchronization follower device on the network interface controller receiving the first clock-synchronization message from the clock-synchronization leader device.

33. A clock synchronization method, comprising:

generating by a boundary clock device a second clock-synchronization message before receiving a first clock-synchronization message from a clock-synchronization leader device;

receiving, by the boundary clock device, the first clock-synchronization message from the clock-synchronization leader device;

generating by the boundary clock device a control dependency to condition sending the second clock-synchronization message to at least one clock-synchronization follower device on receiving the first clock-synchronization message from the clock-synchronization leader device, the clock-synchronization leader device and the clock-synchronization follower device being external to the boundary clock device;

sending, by the boundary clock device, the second clock-synchronization message to the at least one clock-synchronization follower device;

enqueuing a first work queue entry to process receipt of the first clock-synchronization message;

enqueuing a second work queue entry to process sending the second clock-synchronization message; and enqueuing the control dependency to condition sending the second clock-synchronization message to the at least one clock-synchronization follower device on the receiving the first clock-synchronization message from the clock-synchronization leader device.

34. A processing device, comprising:

a processor to execute software to:

generate a second clock-synchronization message before receiving a first clock-synchronization message; and generate a control dependency to condition sending the second clock-synchronization message by a network interface controller to at least one clock-synchronization follower device on the network interface controller receiving the first clock-synchronization message from a clock-synchronization leader device, the clock-synchronization leader device and the clock-synchronization follower device being external to a boundary clock device, which includes the processing device and the network interface controller;

enqueue a first work queue entry to process receipt of the first clock-synchronization message by the network interface controller;

enqueue a second work queue entry to process sending the second clock-synchronization message by the network interface controller; and enqueue the control dependency to condition sending the second clock-synchronization message by the network interface controller to the at least one clock-synchronization follower device on the network interface controller receiving the first clock-synchronization message from the clock-synchronization leader device and a memory to store data used by the processor.

35. A network interface controller device, comprising:

a network interface to receive a first clock-synchronization message from a clock-synchronization leader device and send a second clock-synchronization message to at least one clock-synchronization follower device, the clock-synchronization leader device and the clock-synchronization follower device being external to a boundary clock device, which includes the network interface controller device; and packet processing circuitry to:

process sending the second clock-synchronization message responsively to a control dependency, which conditions sending the second clock-synchronization message to the at least one clock-synchronization follower device on receiving the first clock-synchronization message from the clock-synchronization leader device;

process receipt of the first clock-synchronization message responsively to an enqueued first work queue entry;

update a flag responsively to an enqueued semaphore post and the processing the receipt of the first clock-synchronization message;

intermittently check the flag for a given value responsively to an enqueued semaphore acquire; and process sending the second clock-synchronization message responsively to the semaphore acquire having completed execution.

* * * * *